United States Patent [19]

Morishita et al.

[11] Patent Number: 5,760,513
[45] Date of Patent: Jun. 2, 1998

[54] AC GENERATOR FOR VEHICLE AND METHOD OF ASSEMBLING THE SAME

[75] Inventors: Akira Morishita; Kyoko Kurusu, both of Tokyo, Japan

[73] Assignee: Mitsubishi Denki Kabushiki Kaisha, Tokyo, Japan

[21] Appl. No.: 795,567

[22] Filed: Feb. 6, 1997

[30] Foreign Application Priority Data

Aug. 26, 1996 [JP] Japan ................................. 8-223542

[51] Int. Cl.⁶ ........................... H02N 5/00; H02N 15/00
[52] U.S. Cl. ........................... 310/91; 310/89; 29/596
[58] Field of Search ..................... 310/89, 91, 68 D; 29/596

[56] References Cited

U.S. PATENT DOCUMENTS

| 3,760,209 | 9/1973 | Hult | 310/91 |
|---|---|---|---|
| 4,877,984 | 10/1989 | Colwell et al. | 310/66 |
| 4,945,272 | 7/1990 | Ochi et al. | 310/91 |
| 4,972,113 | 11/1990 | Newberg | 310/217 |
| 4,980,589 | 12/1990 | Ochi et al. | 310/68 D |
| 5,200,658 | 4/1993 | Kohno et al. | 310/89 |
| 5,357,818 | 10/1994 | Hill | 74/16 |
| 5,430,338 | 7/1995 | McMillan et al. | 310/89 |
| 5,487,213 | 1/1996 | Hult et al. | 29/596 |
| 5,650,675 | 7/1997 | Kanaya et al. | 310/58 |
| 5,686,773 | 11/1997 | Sakakibara et al. | 310/91 |

FOREIGN PATENT DOCUMENTS 7274433  10/1995  Japan .

*Primary Examiner*—Steven L. Stephan
*Assistant Examiner*—Michael J. Wallace, Jr.
*Attorney, Agent, or Firm*—Sughrue, Mion, Zinn, Macpeak & Seas, PLLC

[57] ABSTRACT

A bracket 7 is composed of a casing 8 having a journal 8b at the center thereof and an annular flange 9 having a mount 9c projecting radially outwardly from the outer periphery thereof and coupled with the outer periphery of the casing 8, the casing 8 and the annular flange 9 being divided in the axial direction of a rotary shaft 2a. With this arrangement, there can be obtained an AC generator for vehicle the cost of which can be reduced when a new bracket is made.

5 Claims, 10 Drawing Sheets

AC GENERATOR FOR VEHICLE AND METHOD OF ASSEMBLING THE SAME

BACKGROUND OF THE INVENTION

1. Field of the Invention

The present invention relates to the bracket structure of an AC generator for vehicle and a method of assembling the AC generator for vehicle.

2. Description of the Related Art

FIG. 9 is a side elevational view, partly in cross section, showing a conventional AC generator for vehicle. FIG. 10 is a cross sectional view of a conventional front bracket. In FIG. 9 and FIG. 10, an AC generator for vehicle includes a substantially cylindrical stator 1 and a rotor 2 disposed inwardly of the stator 1. The stator 1 and the rotor 2 are accommodated in two brackets, that is, a front bracket 3 and a rear bracket 4. The two brackets are formed to a shape obtained by dividing a short cylindrical vessel having two end surfaces swelled outward into two portions along a plane perpendicular to a neutral axis. The respective divided brackets, that is, the front bracket 3 and the rear bracket 4 have stepped portions 3a, 4a formed along the entire circumferences at the divided positions thereof. The front bracket 3 and the rear bracket 4 support the stator 1 by clamping the outer periphery of the cylindrical iron core 1a of the stator 1 by the steps 3a, 4a. Both the sides of the outer periphery of the iron core 1a of the stator 1 are force fitted into the steps 3a, 4a, respectively so that the stator 1 is positionally regulated in the axial direction and the radial direction thereof.

The front bracket 3 includes a journal 3b at the center thereof to rigidly secure a bearing 5, whereas the rear bracket 4 includes a journal 4b at the center thereof to rigidly secure a bearing 6. The front bracket 3 and the rear bracket 4 journal the rotary shaft 2a of the rotor 2 by causing the front portion and the rear portion of the rotary shaft 2a to pass through the bearing 5 and the bearing 6, respectively.

The front bracket 3 and the rear bracket 4 include a plurality of bolt holes 3c, 4c defined to the outer peripheries thereof, respectively, to cause through bolts 18 to pass therethrough. The plurality of bolt holes 3c, 4c are defined in parallel with the rotary shaft 2a of the rotor 2 and disposed to the outer peripheries of the respective brackets at equal intervals. The bolt 18 passing through the bolt hole 3c of the front bracket 3 is coupled with the rear bracket 4 through the threaded engagement of the male screw defined at the extreme end thereof with the female screw of the bolt hole 4c. The front bracket 3 is fastened to the rear bracket 4 by the through bolts 18.

Further, the front bracket 3 and the rear bracket 4 include mounts 3d, 4d projecting radially from the outer peripheries thereof. The mounts 3d, 4d include mounting holes for rigidly securing the AC generator for vehicle to a not shown vehicle engine. In the AC generator for vehicle of this example, the front bracket 3 includes two mounts 3d and rear bracket 4 includes one mount 4d.

FIG. 11 is a front elevational view showing another example of the conventional front bracket. FIG. 12 is a front elevational view showing still another example of the conventional front bracket. FIG. 13 is a front elevational view showing a further example thereof. Respective front bracket 3 shown in FIG. 11 to FIG. 13 includes a mount 3d, through which an AC generator for vehicle is mounted to a not shown vehicle engine, located at a different position, respectively. This is because that a shape on a vehicle side where the AC generator for vehicle is mounted is different, thus there exist a plurality of types of the front bracket 3 in correspondence to the shape on the vehicle side. When the shape of the mounting position on the vehicle side changes, at least the front bracket 3 to be used has a different shape as described above. Further, the rear bracket 4 to be used also has a different shape. However, the shape of the parts other than them of the AC generator, that is, the shape of the internal parts thereof including the stator 1 and the rotor 2 is not changed even if the shape of the mounting position changes.

In the conventional AC generator for vehicle arranged as described above, the plurality of types of the front bracket and the rear bracket are used depending upon the change of the shape of the mounting position on the vehicle side. Further, when a new engine or vehicle is made, a front bracket 3 and a rear bracket 4 corresponding to it are made.

As described above, the brackets 3, 4 must be newly made depending upon the change of a mounting position on a vehicle side in the conventional AC generator for vehicle.

An object of the present invention is to provide an AC generator for vehicle the cost of which can be reduced when new brackets are made.

SUMMARY OF THE INVENTION

According to one aspect of the present invention, at least one of brackets comprises a casing having the journal at the center thereof and an annular flange having a mount projecting radially outwardly from the outer periphery thereof and coupled with the outer periphery of the casing in the axial direction of the rotary shaft.

In another form of the present invention, an engaging portion is defined to one of the confronting surfaces of the outer periphery of the casing and the outer periphery of the flange over the entire circumference thereof in a peripheral direction, an engaged portion with which the engaging portion is engaged is defined to the other of the confronting surfaces and the casing is coupled with the flange by engaging the engaging portion with the engaged portion.

In still another form of the present invention, the flange comprises a first annular flange having a first mount projecting radially and outwardly from the outer periphery thereof and coupled with the outer periphery of the casing and a second annular flange having a second mount projecting radially and outwardly from the outer periphery thereof and coupled with the outer periphery of the first flange in the axial direction of the rotary shaft.

According to another aspect of the present invention, preparing two brackets at least one of which comprising a casing having the journal at the center thereof and an annular flange having a mount projecting radially outwardly from the outer periphery thereof and coupled with the outer periphery of the casing in the axial direction of the rotary shaft, the flange including a plurality of different types of flanges corresponding to various mounting positions of a vehicle and coupled with the casing.

In another form of the present invention, the casing has a first positioning lug projecting radially outwardly from the outer periphery thereof, the flange has a second positioning lug projecting radially outwardly from the outer periphery thereof, and the casing and the flange are positioned in the peripheral direction thereof selective each other by being rotated about the rotary shaft and causing the first positioning lug and the second positioning lug to be abutted against a same plane of a jig extending in the direction of the rotary shaft.

DESCRIPTION OF THE PREFERRED EMBODIMENT

Embodiment 1

Figure 1:
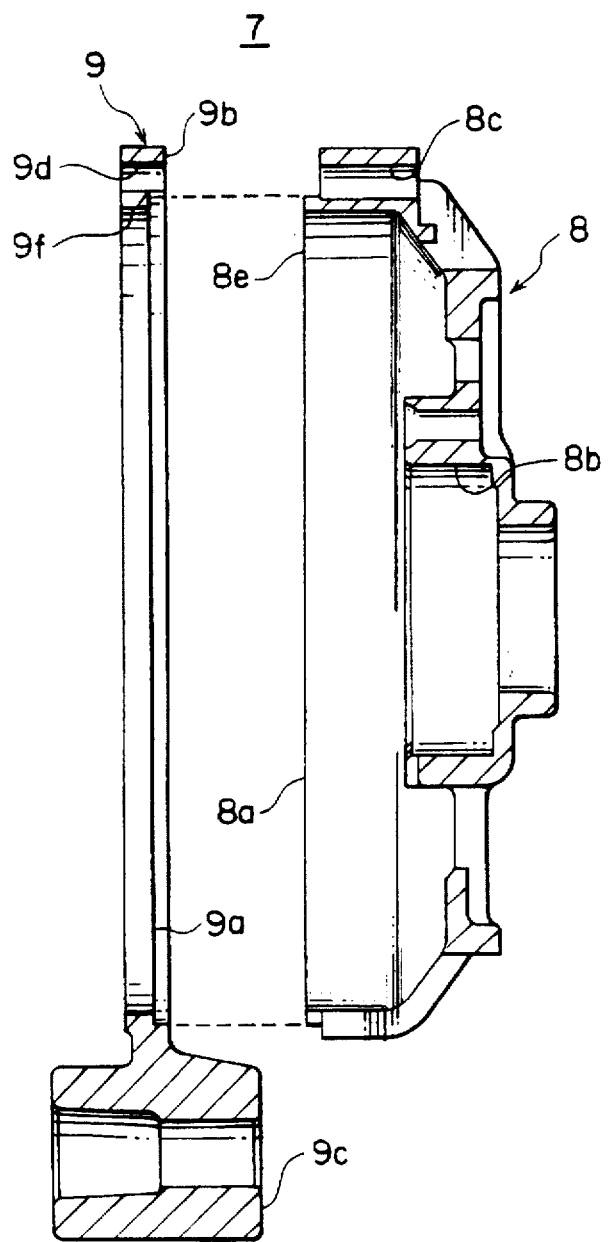
FIG. 1 is a cross sectional view of the front bracket of an AC generator for vehicle of the present invention.
Figure 2:
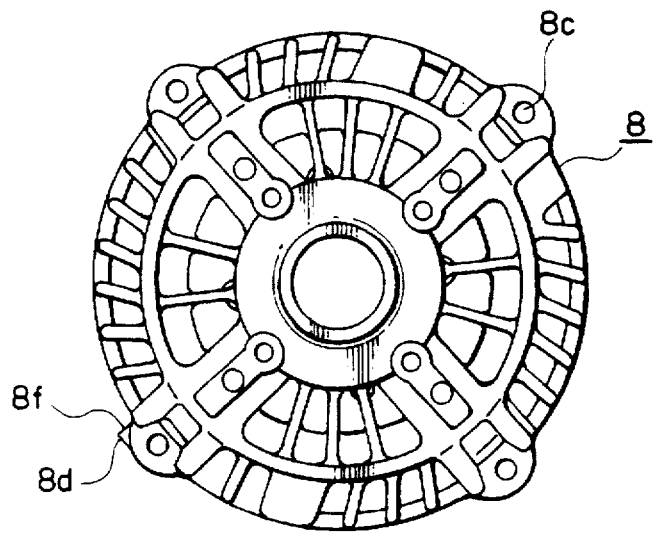
FIG. 2 is a front elevational view of the casing of the front bracket.
Figure 3:
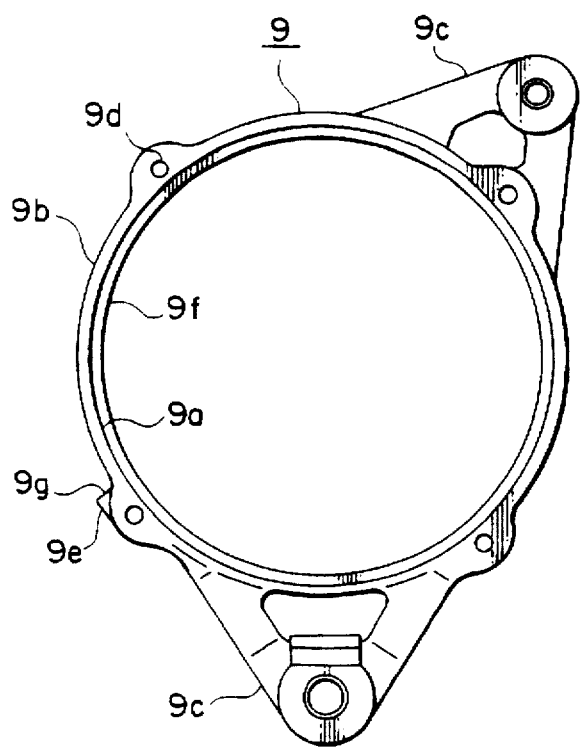
FIG. 3 is a front elevational view of the flange of the front bracket.
Figure 4:
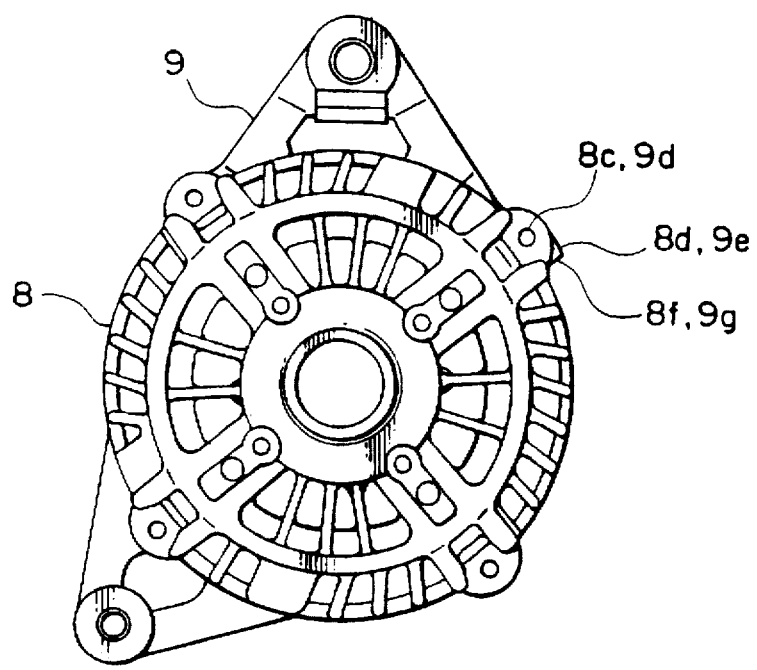
FIG. 4 is a front elevational view showing the state that the casing is placed on the flange one upon another.

FIG. 1 is a cross sectional view of the front bracket of an AC generator for vehicle of the present invention. FIG. 2 is a front elevational view of the casing of the front bracket. FIG. 3 is a front elevational view of the flange of the front bracket. In FIG. 1 to FIG. 3, the AC generator for vehicle of the present invention has a front bracket 7 divided into two portions by being axially cut along a plane perpendicular to the axis of the AC generator, that is, the front bracket 7 is divided into a casing 8 and a flange 9. Further, a rear bracket to be described later is also divided into a casing and a flange likewise. The other arrangement of the AC generator for vehicle is the same as the conventional AC generator for vehicle.

The casing 8 as one of the thus divided casing 8 and flange 9 is formed to a substantially plate shape with a journal 8b located at the center thereof for rigidly securing a bearing 5. The flange 9 as the other thereof is composed of an annular portion 9b to be coupled with the outer periphery of the casing 8 and two mounts 9c radially outwardly projecting from the annular portion 9b.

The casing 8 includes a projection 8a as an engaging portion formed on a surface to be coupled with the flange 9 along the circumference thereof. On the other hand, the flange 9 includes a recess 9a as an engaged portion to be engaged with the projection 8a. The casing 8 is coupled with the flange 9 by force fitting the projection 8a into the recess 9a. The casing 8 and the flange 9 are arranged such that a step is formed by the inner surface 9f of the flange 9 and the end surface 8e of the projection 8a of the casing 8 as the result of the coupling thereof. The outer periphery of the cylindrical iron core 1a of a stator 1 is supported by being clamped by the step so that the stator 1 is positionally regulated in the axial direction and the radial direction thereof likewise the prior art.

The casing 8 and the flange 9 have four bolt holes 8c, 9d defined to the outer peripheries thereof for causing through bolts 18 to pass therethrough. The casing 8 further includes a first positioning lug 8d projecting radially outwardly from the outer periphery thereof. The flange 9 also includes a second lug 9e projecting radially outwardly from the outer periphery thereof. The first positioning lug 8d and the second positioning lug 9e includes abutting surfaces 8f, 9g formed to the same plane approximately including the axis of a rotary shaft 2a. placed on the flange 9 one upon another. The casing 8 and the flange 9 are positioned in such a manner that the bolt holes 8c are caused to coincide with the bolt holes 9d and the abutting surfaces 8f, 9g of the first positioning lug 8d and the second positioning lug 9e are disposed on the same plane.

Figure 5:
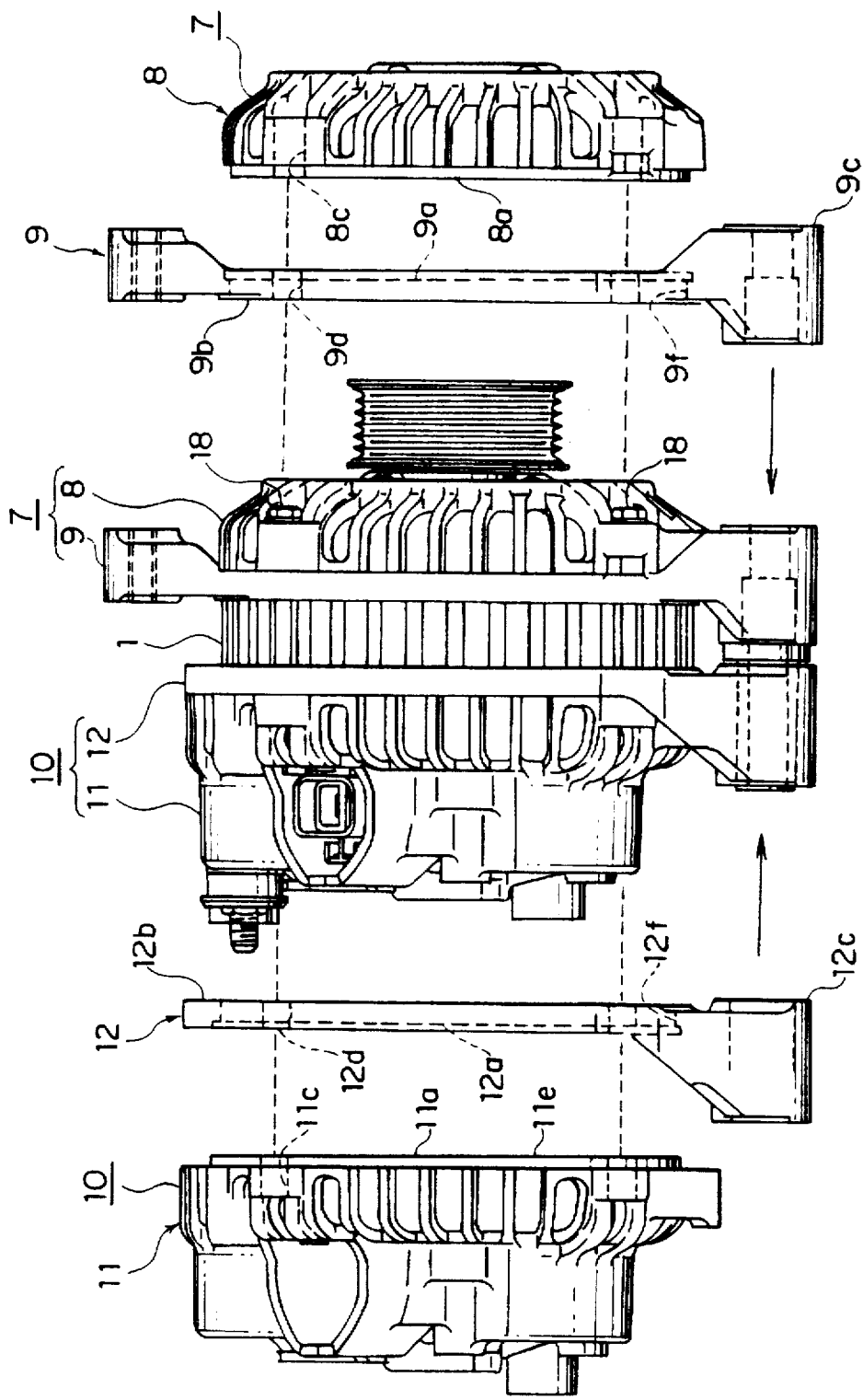
FIG. 5 is a view showing how the AC generator for vehicle of the present invention is assembled.

FIG. 5 is a view showing how the AC generator for vehicle of the present invention is assembled. As shown in FIG. 5, a rear bracket 10 is also divided into two portions, that is, a casing 11 and a flange 12 by being axially cut along a plane perpendicular to the axis of the AC generator for vehicle. The casing 11 as one the thus divided casing 11 and flange 12 of the rear bracket 10 includes a not shown journal at the center thereof for rigidly securing a bearing 6. The flange 12 as the other thereof is composed of an annular portion 12b to be coupled with the outer periphery of the casing 11 and mounts 12c projecting radially outwardly from the annular portion 12b.

The casing 11 includes a projection 11a as an engaging portion formed on a surface to be coupled with the flange 12 along the circumference thereof. On the other hand, the flange 12 includes a recess 12a as an engaged portion to be engaged with the projection 11a. The casing 11 is coupled with the flange 12 by force fitting the projection 11a into the recess 12a. The casing 11 and the flange 12 are arranged such that a step is formed by the inner surface 12f of the flange 12 and the end surface 11e of the projection 11a of the casing 11 as the result of the coupling thereof. The outer periphery of the cylindrical iron core 1a of the stator 1 is supported by being clamped by the step so that the stator 1 is positionally regulated in the axial direction and the radial direction thereof likewise the prior art.

The casing 11 and the flange 12 have four bolt holes 11c, 12d defined to the outer peripheries thereof for causing the through bolts to pass therethrough. A female screw is formed to the bolt holes 11c of the casing 11. Further, the casing 11 and the flange 12 include a not shown first positioning lug and a second positioning lug also not shown projecting radially outwardly from the outer peripheries thereof. The first positioning lug and the second positioning lug include abutting surfaces formed to the same plane approximately including the axis of the rotary shaft 2a likewise the first positioning lug 8d and the second positioning lug 9e of the casing 8 and the flange 9.

When the AC generator for vehicle arranged as described above is assembled, the rotor 2 is first disposed in the stator 1 coaxially therewith. Next, the stator 1 is clamped by the two flanges 9, 12 from both the sides in the axial direction thereof. Further, the casings 8, 11 are disposed outwardly of the two flanges 9, 12. At the time, the rotary shaft 2a of the rotor 2 is caused to pass through the bearings 5, 6 provided with the respective casings 8, 11. Then, after the respective components are positioned in the peripheral direction thereof, they are force fit to and coupled with one another. Finally, after the through bolts 18 inserted from the casing 8 side are caused to pass through the respective bolt holes 8c, 9d, 12d, they are coupled with the female screws defined to the bolt holes 11c, by which the AC generator is completed by tightening the casing 8 to the casing 11 by the through bolts 18.

Note, the AC generator for vehicle arranged as described above is automatically assembled in many cases. When it is automatically assembled, the casing 8, the flange 9, the stator 1, the flange 12 and the casing 11 are placed on, for example, a predetermined jig one upon another in this sequence. At the time, the respective projections are slightly inserted into the recesses at the extreme ends thereof and the respective components are made coaxially rotatable by being guided by the recesses. The respective components are rotated in a peripheral direction in this state and the positioning lugs of the respective components are abutted against the same plane of the jig extending in the axial direction of the AC generator so that the components are positioned in the peripheral direction thereof one another After the positioning, the components are force fit into one another. Thereafter, they are fastened to one another by the through holes 18 to thereby complete the AC generator.

Several types of the flange 9 and the flange 12 are prepared in correspondence to the types of the mounting position on the vehicle side Then, one of them is selected and assembled. As to the components other than the flanges 9 and 12, the same components are used regardless of the types of the mounting position of the engine on the engine side Further, when the mounting position on the vehicle side is changed by the model change of the vehicle, the development of a new engine and the like, only the design of the flanges 9, 12 is changed and new flanges 9, 12 are made and the other components are unchanged.

In the AC generator for vehicle arranged as described above, since it suffices to newly make only the flanges 9, 12 even if the mounting position on the vehicle side is changed, the number of components to be newly made is reduced, thus a manufacturing cost including a cost for manufacturing metal molds can be reduced. In addition, since the casings 8, 11 are not changed even if the mounting position on the vehicle side is changed, they are not wasted even if they are made in the large number.

In the AC generator for vehicle arranged as described above, the engaging portions and the engaged portions are formed to the surface where the casing 8 is coupled with the flange 9 and the surface where the casing 11 is coupled with the flange 12 in the peripheral directions thereof. As a result, they are not displaced in a radial direction each other, by which the reliability of a product is enhanced. Further, since the respective components are positioned by abutting the positioning lugs 8d, 9e projecting from the outer peripheries thereof against the same plane, they can be easily positioned and excellent workability can be obtained. In addition, an automatic assembly can be easily realized in automation.

Although the front bracket 7 and the rear bracket 10 are divided, respectively, in the embodiment, a certain advantage can be expected even if only one of them is divided. Note, the projection 8a and the recess 9a and the projection 11a and the recess 12a as the engaging portions and the engaged portions defined to the respective coupling surfaces may be defined reversely. In addition, the recess 9a may be a groove defined along the circumference.

Embodiment 2

Figure 6:
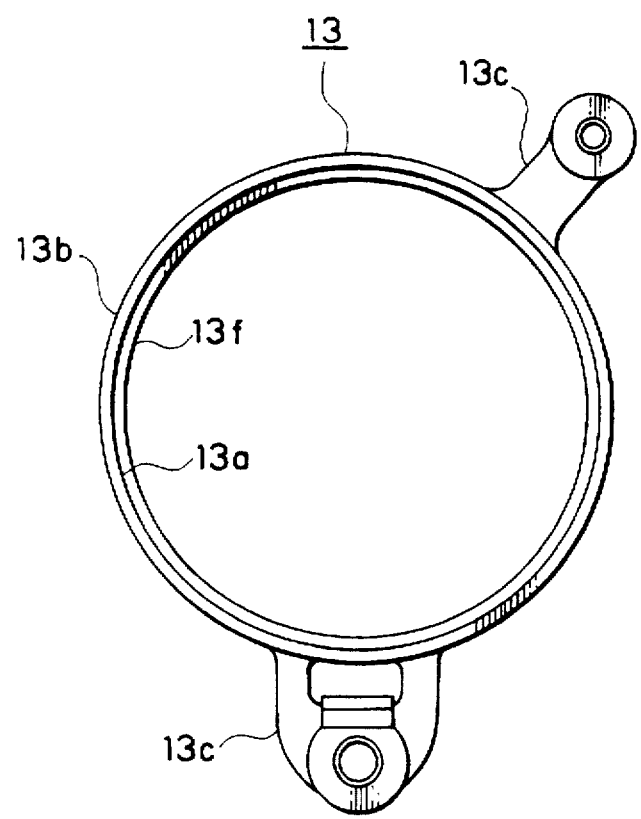
FIG. 6 is a front elevational view of the flange of a front bracket showing another example of the AC generator for vehicle of the present invention.

FIG. 6 is a front elevational view of the flange of a front bracket showing another example of the AC generator for vehicle of the present invention. A flange 13 of the embodiment is composed of an annular portion 13b to be coupled with the outer periphery of a casing 8 and two mounts 13c projecting radially outwardly from the annular portion 13b likewise the flange 9 of the embodiment 1. However, the flange 13 of the embodiment has no bolt hole defined to the annular portion 13b.

The flange 13 is assembled by being combined with the casing 8 likewise the embodiment 1. The flange 13 includes a recess 13a as an engaged portion with which the projection 8a of the casing 8 is engaged. The casing 8 is coupled with the flange 13 by force fitting the projection 8a into the recess 13a. The casing 8 and the flange 13 are arranged such that a step is formed by the inner surface 13f of the flange 13 and the end surface 8e of the projection 8a of the casing 8 as the result of the coupling thereof. The outer periphery of the cylindrical iron core 1a of a stator 1 is supported by being clamped by the step so that the stator 1 is positionally regulated in the axial direction and the radial direction thereof likewise the embodiment 1.

When the casing 8 and the flange 13 are assembled, they are force fit by being rotated an arbitrary angle in a peripheral direction. Then, the two mounts 13c are positioned at arbitrary locations in the peripheral direction with respect to the casing 8. Since the two mounts 13c project between through bolts 18, the legs thereof are thinned in the peripheral direction so as to increase an angle to be selected, whereas the wall thickness of the mounts 13c is increased in an axial direction to compensate the thinned legs. The other arrangement of the flange 13 is the same as the flange 9 of the embodiment 1.

Although not shown, no bolt hole is also defined to the annular portion of the flange of a rear bracket. As a result, a casing 11 and the flange of the embodiment are force fit by being rotated an arbitrary angle in the peripheral direction likewise the front bracket.

Through bolts 18 are caused to pass through the bolt holes 8c of the casing 8 of the front bracket likewise the embodiment 1 and coupled with the female screws formed to the bolt holes 11c of the casing 11 of the rear bracket. The casing 8 is fastened to the casing 11 by the through bolts 18. The two flanges disposed to the inside of the respective casings 8, 11 are not rotated after they are assembled because the projections 8a, 11a of the casings 8, 11 are force fit into the recesses thereof and the flanges are clamped between the casings 8, 11 and the iron core 1a of the stator 1.

In the AC generator for vehicle arranged as described above, no bolt hole is defined to the annular portions of the two flanges for causing the through bolts 18 to pass therethrough. Then, the respective flanges are force fit into the casings 8, 11 by being rotated by the arbitrary angle. As a result, the mounts disposed to the respective flanges can be oriented to any arbitrary direction, respectively. Thus, since the embodiment can cope with a more variety of mounting positions, a manufacturing cost including a cost for making metal molds can be further reduced.

Embodiment 3

Figure 7:
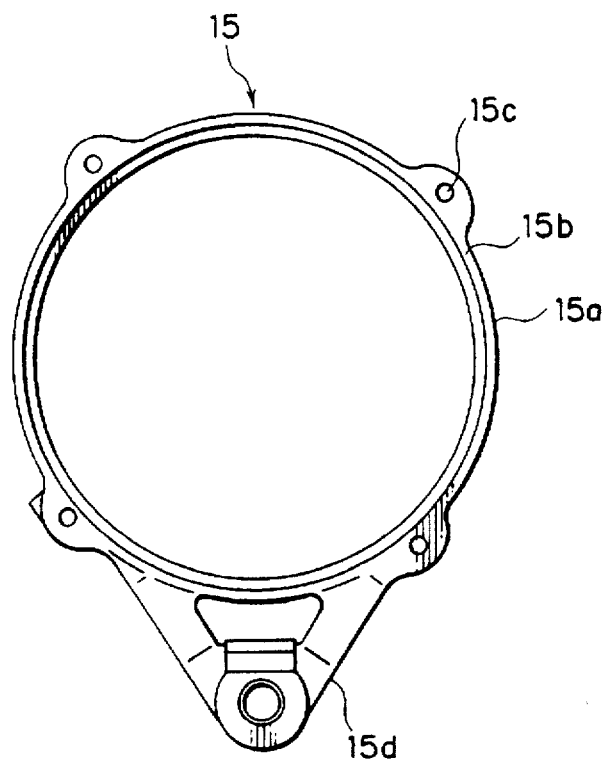
FIG. 7 is a front elevational view of a first flange showing another example of the AC generator for vehicle of the present invention.
Figure 8:
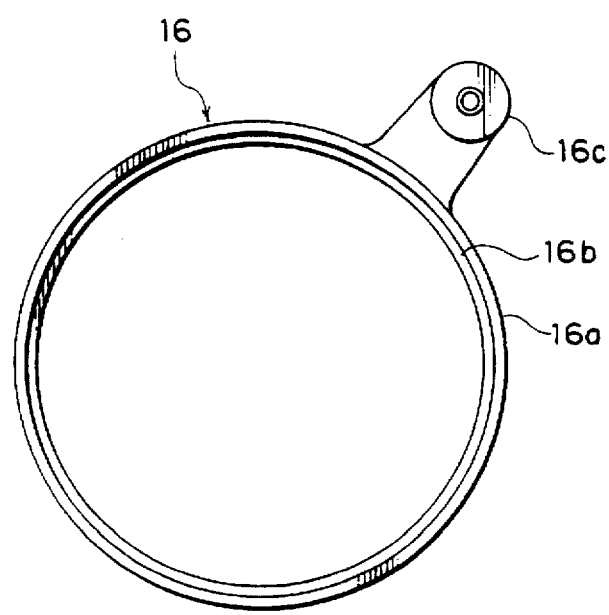
FIG. 8 is a front elevational view of a second flange showing the another example of the AC generator for vehicle of the present invention.
Figure 9:
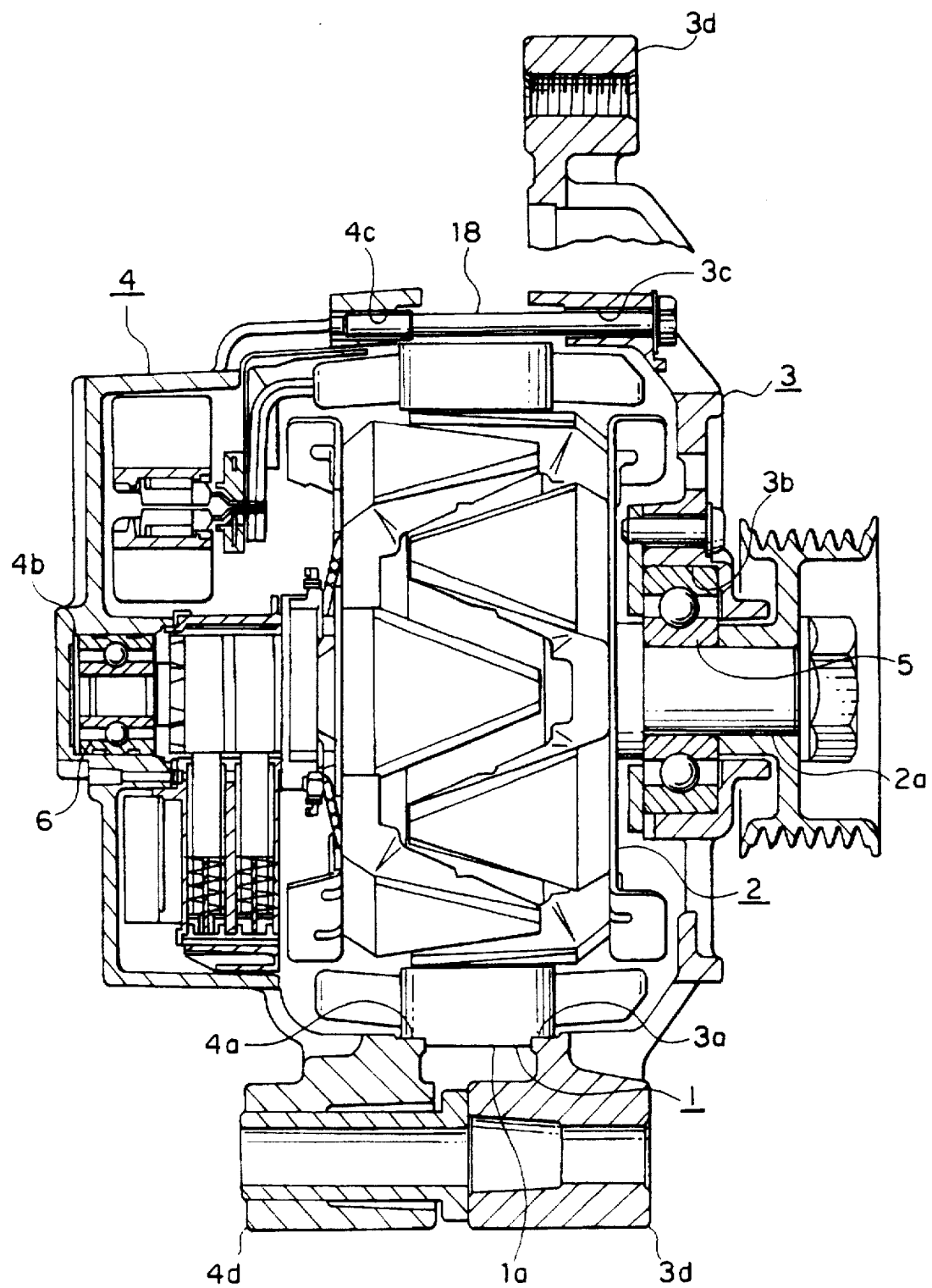
FIG. 9 is a side elevational view, partly in cross section, showing a conventional AC generator for vehicle.
Figure 10:
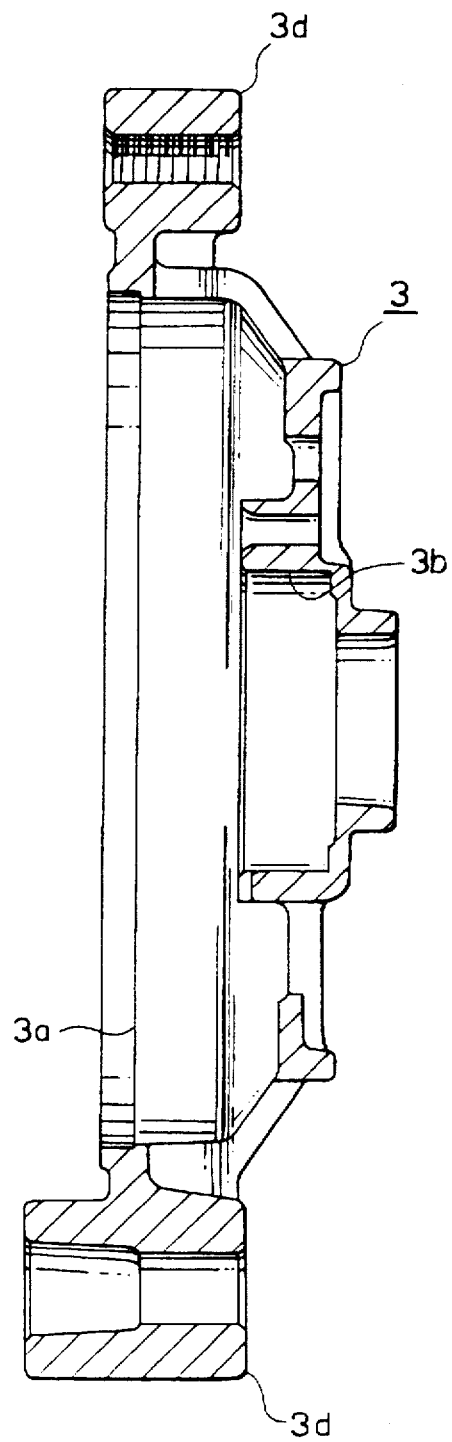
FIG. 10 is a cross sectional view of a conventional front bracket.
Figure 11:
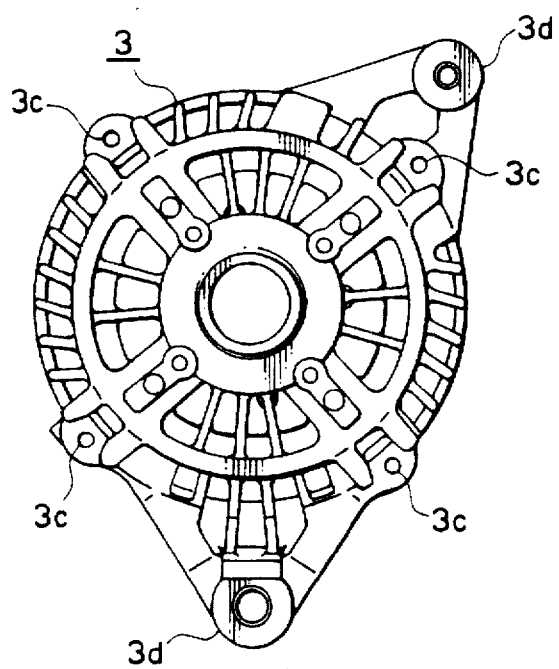
FIG. 11 is a front elevational view showing another example of the conventional front bracket.
Figure 12:
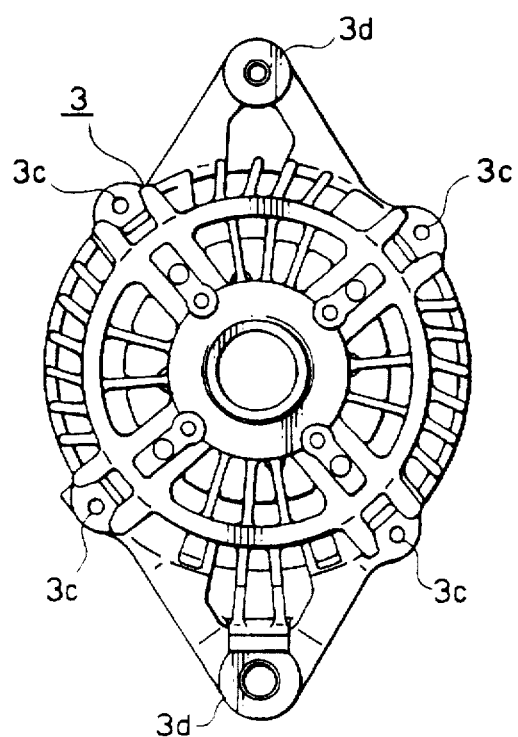
FIG. 12 is a front elevational view showing still another example of the conventional front bracket.
Figure 13:
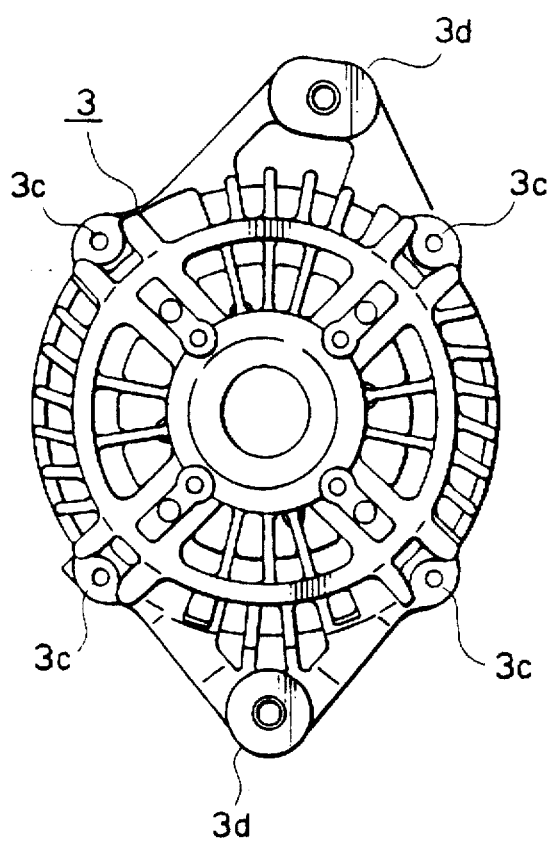
FIG. 13 is a front elevational view showing a further example of the conventional front bracket

FIG. 7 is a front elevational view of a first flange showing another example of the AC generator for vehicle of the present invention and FIG. 8 is a front elevational view of a second flange. The flange of the embodiment is further sliced along a plane perpendicular to the axis of the AC generator and divided into two portions in an axial direction. That is, the flange is divided into the first flange 15 and the second flange 16. Components including a casing 8 to be coupled with the first flange 15 are arranged likewise the embodiment 1.

The first flange 15 is composed of a first annular portion 15a to be coupled with the outer periphery of the casing 8 and a first mount 15d projecting radially outwardly from the first annular portion 15a. The first annular portion 15a has four bolt holes 15c defined to the outer periphery thereof. Further, the first annular portion 15a has a recess 15b defined to a surface to be coupled with the casing 8 along the circumference thereof. The projection 8a of the casing 8 is force fit into the recess 15b. In addition, the first annular portion 15a includes a not shown projection defined along the circumference of the surface opposite to the surface where the recess 15b is defined.

On the other hand, the second flange 16 is composed of a second annular portion 16a to be coupled with the outer periphery of the first annular portion 15a and a second mount 16c projecting radially outwardly from the second annular portion 16a. The second annular portion 16a has a recess 16b defined to a surface to be coupled with the first annular portion 15a along the circumference thereof. The projection of the first annular portion 15a is force fit into the recess 16b. In addition, the second annular portion 16a includes a not shown recess defined along the circumference of the surface opposite to the surface where the recess 16b is defined. The outer periphery of the iron core 1a of a stator 1 is force fit into the recess.

The first flange 15 is coupled with the second flange 16 by force fiting the not shown projection of the first annular portion 15a into the recess 16b of the second annular portion 16a. At the time, the first annular portion 15a and the second annular portion 16a are force fit by being rotated an arbitrary angle in a peripheral direction. As a result, the positions of the two mounts 15d, 16c can be changed.

Assembly is carried out by causing through bolts 18 passing through the bolt holes of other components to pass through the bolt holes 15c of the first flange 15. The second flange 16 is not rotated after it is assembled because the projection of the first annular portion 15a is force fit into the recess 16b of the second flange 16 and the second flange 16 is clamped between the first flange 15 and the iron core 1a of a stator 1 by the fastening force of the through bolts 18.

In the AC generator for vehicle arranged as described above, since the flange is divided into the first flange 15 and the second flange 16, the angles of the two mounts 15d, 16c can be changed. As a result, only one type of the flange can cope with the change of a mounting position on a vehicle side, thus a manufacturing cost including a cost for making metal molds can be further reduced.

According to one aspect of the present invention, at least one of brackets comprises a casing having the journal at the center thereof and an annular flange having a mount projecting radially outwardly from the outer periphery thereof and coupled with the outer periphery of the casing in the axial direction of the rotary shaft. As a result, since it suffices to newly make only the flange even if a mounting position on a vehicle side is changed, the number of components to be newly made is reduced, thus a manufacturing cost including a cost for manufacturing a metal mold can be reduced. In addition, since the casing is not changed even if a mounting position on a vehicle side is changed, the casing is not wasted even if it is made in the large number.

In another form of the present invention, an engaging portion is defined to one of the confronting surfaces of the outer periphery of the casing and the outer periphery of the flange over the entire circumference thereof in a peripheral direction, an engaged portion with which the engaging portion is engaged is defined to the other of the confronting surfaces and the casing is coupled with the flange by engaging the engaging portion with the engaged portion. As a result, the casing and the flange are not displaced in a radial direction, by which the reliability of a product is enhanced.

In still another form of the present invention, the flange comprises a first annular flange having a first mount projecting radially and outwardly from the outer periphery thereof and coupled with the outer periphery of the casing and a second annular flange having a second mount projecting radially and outwardly from the outer periphery thereof and coupled with the outer periphery of the first flange in the axial direction of the rotary shaft. As a result, the angles at which the first mount and the second mount are disposed can be changed, thus even if a mounting position on a vehicle side is changed, the change can be coped with by one type of a flange, by which a manufacturing cost can be further reduced.

According to another aspect of the present invention, preparing two brackets at least one of which comprising a casing having the journal at the center thereof and an annular flange having a mount projecting radially outwardly from the outer periphery thereof and coupled with the outer periphery of the casing in the axial direction of the rotary shaft, the flange including a plurality of different types of flanges corresponding to various mounting positions of a vehicle and coupled with the casing. As a result, since it suffices to newly make only the flange even if a mounting position on a vehicle side is changed, the number of components to be newly made is reduced, thus a manufacturing cost including a cost for manufacturing a metal mold can be reduced. In addition, since the casing is not changed even if a mounting position on a vehicle side is changed, the casing is not wasted even if it is made in the large number.

In another form of the present invention, the casing has a first positioning lug projecting radially outwardly from the outer periphery thereof, the flange has a second positioning lug projecting radially outwardly from the outer periphery thereof, and the casing and the flange are positioned in the peripheral direction thereof selective to each other by being rotated about the rotary shaft and causing the first positioning lug and the second positioning lug to be abutted against a same plane of a jig extending in the direction of the rotary shaft. As a result, the casing and the flange can be easily positioned each other. In particular, when they are automatically assembled, automation can be easily realized.

What is claimed is:

1. An AC generator for vehicle, comprising:
   a cylindrical stator;
   a rotor disposed inside of said stator and having a rotary shaft, said rotary shaft having an axis concentric with said stator;
   two brackets individually disposed alone said axis, at ends of said rotary shaft, said brackets accommodating said stator and said rotor, said brackets clamping said stator by the outer peripheries of said brackets and journaling both ends of said rotary shaft by at least one journal disposed at a center of each of said brackets; and
   a plurality of through bolts for fastening said outer peripheries of said two brackets;
   wherein at least one of said brackets comprises a peripherally extending axially outer casing and a mating peripherally extending axially inner flange, said casing having said journal at the center thereof, said flange having at least one integral mount projecting radially outwardly from the outer periphery thereof.

2. AN AC generator for vehicle according to claim 1, wherein said casing further comprises an integral axially inner engaging portion extending over the entire circumference thereof in a peripheral direction, said flange further comprising an integral axially outer engaged portion extending over the entire circumference thereof in a peripheral direction, said casing being coupled with said flange at said engaging portion.

3. An AC generator for vehicle according to claim 1, wherein said flange comprises a first annular flange having a first integral mount projecting radially and outwardly from the outer periphery thereof, said first annular flange being coupled with said axially inner periphery of said casing and a second annular flange having a second integral mount projecting radially and outwardly from the outer periphery thereof, said second annular flange being coupled with said axially inner periphery of said first annular flange in the axial direction of said rotary shaft.

4. A method of assembling an AC generator for vehicle, comprising the steps of:

disposing a rotor having a rotary shaft inside a cylindrical stator, said rotary shaft having an axis concentric with said stator;

preparing two brackets each having a centrally disposed journal, wherein at least one of said brackets comprises a peripherally extending axially outer casing and a mating peripherally extending axially inner flange, said casing having said journal at the center thereof, said flange having at least one integral mount projecting radially outwardly from the outer periphery thereof;

coupling said flange with the outer periphery of said casing in the axial direction of said rotary shaft;

journaling both ends of said rotary shaft by said two brackets;

clamping said cylindrical stator by the outer peripheries of said two brackets; and fastening said outer peripheries of said two brackets by a plurality of through bolts.

5. A method of assembling an AC generator for vehicle according to claim 4, wherein said casing further comprises an integral first positioning lug projecting radially outwardly from the outer periphery thereof, said first lug having a first abutting surface, and said flange further comprises an integral second positioning lug projecting radially outwardly from the outer periphery thereof, said second lug having a second abutting surface, further comprising the step of positioning said casing relative to said flange in the peripheral direction thereof by axially rotating said casing and said flange about said rotary shaft until said first and said second abutting surfaces are co-planar.

* * * * *